May 6, 1958     H. E. CHERWINK     2,833,060
GRADER ATTACHMENT FOR A TRACTOR
Filed March 16, 1956
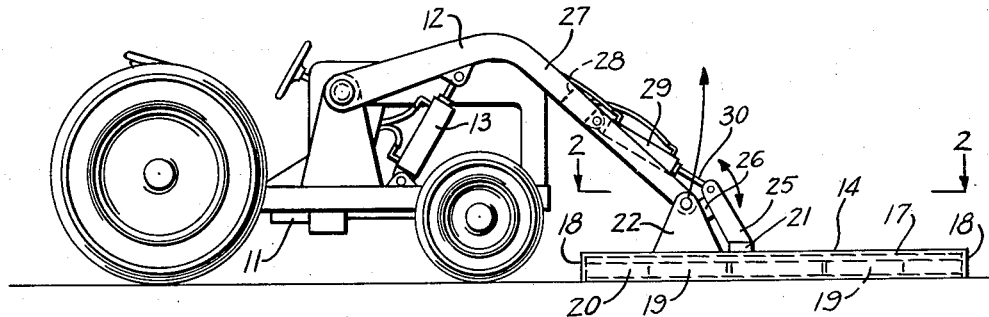
FIG. 1
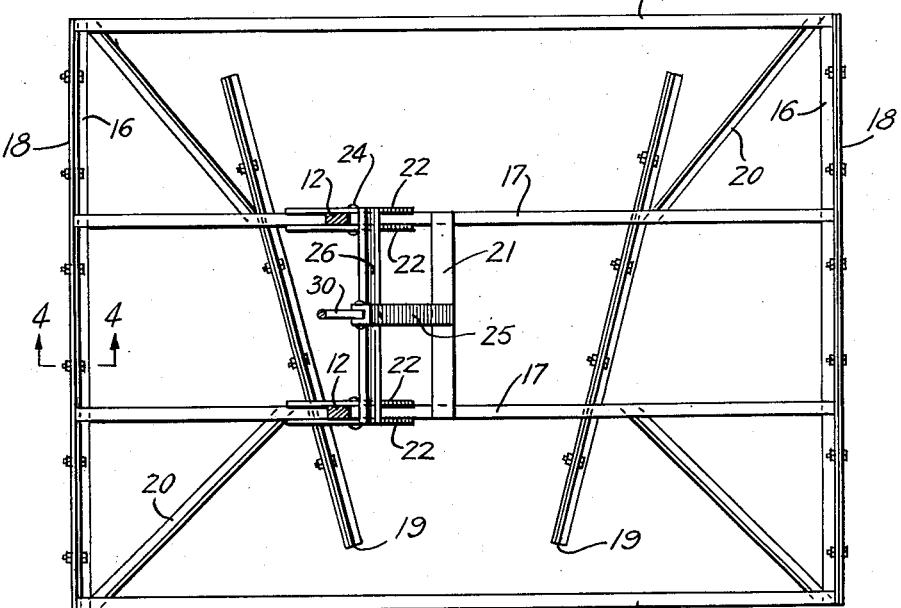
FIG. 4
FIG. 2
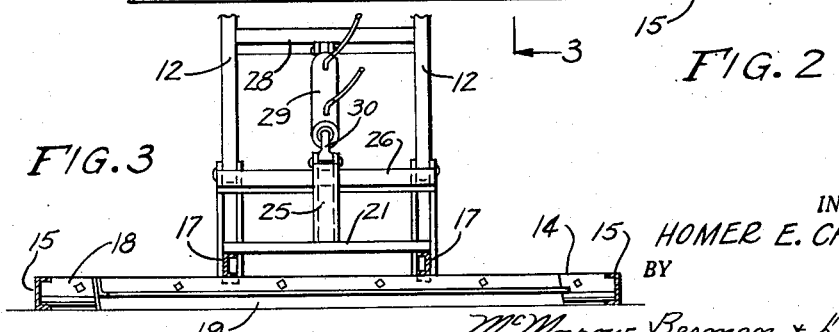
FIG. 3
INVENTOR.
HOMER E. CHERWINK
BY
McMorrow, Berman & Davidson
ATTORNEYS

United States Patent Office 2,833,060
Patented May 6, 1958

2,833,060

GRADER ATTACHMENT FOR A TRACTOR

Homer E. Cherwink, Riddle, Oreg.

Application March 16, 1956, Serial No. 572,015

4 Claims. (Cl. 37—153)

This invention relates to grader devices, and more particularly to a grader attachment which is adapted to be employed on a tractor-mounted loader, so that the attachment may be used forwardly of the tractor.

A main object of the invention is to provide a novel and improved grader attachment intended primarily for use in smoothing and shaping lawns, and similar operations, and adapted for attachment to a tractor-mounted loader, the attachment being simple in construction, being easy to install, and being highly effective for spreading loose gravel and dirt, and for similar operations.

A further object of the invention is to provide an improved tractor grader attachment for use on a tractor-mounted loader in place of the loader bucket, the attachment being inexpensive to fabricate, being rugged in construction, and being easy to control.

Further objects and advantages of the invention will become apparent from the following description and claims, and from the accompanying drawings wherein:

Figure 1 is a side elevational view of a tractor having a loader mounted thereon, the loader being provided with an improved grader attachment according to the present invention.

Figure 2 is an enlarged horizontal cross sectional view taken on the line 2—2 of Figure 1.

Figure 3 is a transverse vertical cross sectional view taken on the line 3—3 of Figure 2.

Figure 4 is an enlarged vertical cross sectional detail view taken on the line 4—4 of Figure 2.

Referring to the drawings, 11 designates a conventional tractor having a loader mounted thereon, the loader comprising the loader arms 12, 12 which extend forwardly from the tractor 11, and which may be raised and lowered by conventional means, for example, the hydraulic cylinder 13 mounted on the tractor 11.

Designated generally at 14 is a grader attachment according to this invention, which may be secured to the loader arms 12, 12 in place of the loader bucket. The attachment 14 comprises a generally rectangular frame having the longitudinal side members 15, 15 and the transverse end members 16, 16 rigidly connected to define the aforesaid rectangular frame. The transverse end members 16, 16 are further connected at intermediate points thereon by respective longitudinal inner frame bars 17, 17 which are secured on the top edge portions of the end bars 16, 16.

Secured to the end bars 16, 16 are the respective transverse scraper blade elements 18, 18, and secured to the intermediate portions of the inner longitudinal bars 17, 17 in non-parallel, generally transversely extending positions are the scraper blades 19, 19, said blades 19, 19 being in divergent relationship at one side of the frame and in convergent relationship at the other side thereof, as is clearly shown in Figure 2. The frame is further braced between the non-parallel scraper members 19, 19 and the end bars 16, 16 by brace bars 20 extending diagonally from the corners of the frame toward the inner longitudinal bars 17, 17 and being rigidly connected thereto.

The longitudinal frame bars 17, 17 are connected at their intermediate portions by a transverse support bar 21. Adjacent the support bar 21, the longitudinal bars 17, 17 have rigidly secured thereto the upstanding triangular pairs of lugs 22, 22 which are in transverse alignment, as shown in Figure 2, and between which the ends of the loader arms 12, 12 are received and are pivotally connected, as by pivot pins 24. Rigidly secured on the mid portion of the transverse bar 21 is an upstanding arm 25 which is inclined and which extends substantially parallel to the plane of the adjacent edges of the lugs 12, 12. The upper portion of the arm 25 is rigidly secured to a transverse bar 26 whose ends are rigidly secured to the upper portions of the edges of the respective pairs of lugs 22, 22, as is clearly shown in Figure 2, whereby the arm 25 is rigidly connected to the lugs 22.

The loader arms 12, 12 are rigidly connected at their downwardly and forwardly inclined portions 27 by a transverse bar 28 to the intermediate portion of which is pivoted a hydraulic cylinder 29. The end of the piston rod 30 of the cylinder 29 is pivotally connected to the top end of the arm 25, whereby the angular position of the scraper frame 14 may be regulated by means of the hydraulic cylinder 29. The hydraulic cylinder is of course connected by suitable conduits to the hydraulic pump of the tractor 11, as is the cylinder 13, whereby the elevation of the scraper frame 14, as well as its inclination may be regulated by the respective cylinders 13 and 29.

In operation, the grading attachment 14 is supported forwardly of the tractor and engages the ground as the tractor moves forwardly over its course of travel, the operator being enabled to tilt the frame 14 around the axis of the pins 24, as well as to vary the elevation of the frame with respect to the ground, by means of the respective cylinders 29 and 13. Thus, the downward force applied on the frame 14 may be regulated by the hydraulic cylinder 13, and the inclination of the frame 14 may be similarly regulated by cylinder 29, so that the most efficient applied force and angular position of the frame 14 may be obtained in accordance with the type of soil being smoothed or in accordance with the type of material being otherwise spread or graded by the device. Thus, loose materials such as dirt or gravel can be efficiently pushed or dragged and leveled by engaging the grader frame 14 therewith as described. Since the attachment is mounted forwardly of the tractor, the attachment is always in full view of the operator and thus the grading operation can be accurately and efficiently performed, since the operator is in complete control of the action of the grading frame 14 at all times.

As shown in Figure 4, the transverse end bars 16, 16 comprise angle members and the longitudinal frame bars 15 comprise channel bars receiving the ends of the angle bars and being rigidly connected thereto. The scraper blades 18 are rigidly connected to the transverse end bars 16 in any suitable manner, as for example, by bolts 31. Alternatively, the scraper blades 18 may be connected to the transverse frame bars by welding or other suitable means. The inner scraper members 19, 19 are similar in construction to the end scraper members, comprising scraper blades secured to angle bars, the angle bars being in turn rigidly secured to the inner longitudinal members 17, 17.

While a specific embodiment of an improved tractor-mounted grading attachment has been disclosed in the foregoing description, it will be understood that various modifications within the spirit of the invention may occur to those skilled in the art. Therefore, it is intended

What is claimed is:
1. In combination, a tractor, a loader arm pivoted to said tractor and extending forwardly of the tractor, a grader frame of substantial horizontal area pivotally connected at its intermediate top portion to the end of the loader arm, whereby said frame may be supported in a substantially horizontal position forwardly of the tractor below said loader arm, and a fluid pressure operated extensible link member connected between an intermediate portion of said loader arm and a portion of said grader frame spaced longitudinally from the pivotal connection of the frame to the loader arm, whereby the angular position of the frame may be regulated responsive to operation of said link member.

2. In combination, a tractor, a loader arm pivoted to said tractor, a grader frame of substantial horizontal area, upstanding lug means on the frame, means pivotally connecting the end of said loader arm to the top portion of said lug means, whereby said frame may be supported in a substantially horizontal position forwardly of the tractor below said loader arm, and a fluid pressure operated extensible link member connected between an intermediate portion of said loader arm and a portion of said grader frame spaced longitudinally from the pivotal connection of the frame to the loader arm, whereby the angular position of the frame may be regulated responsive to operation of said link member.

3. In combination, a tractor, a loader arm pivoted to said tractor and extending forwardly of the tractor, a grader frame of substantial horizontal area, upstanding lug means on the intermediate portion of said frame, means pivotally connecting the end of said loader arm to the top portion of said lug means, whereby said frame may be supported in a substantially horizontal position forwardly of the tractor below said loader arm, an upstanding arm rigidly secured to the frame and being spaced longitudinally from said lug means, and a fluid pressure operated extensible link member connected between an intermediate portion of said loader arm and the top end portion of said upstanding arm, whereby the angular position of the frame may be regulated responsive to operation of said link member.

4. In combination, a tractor, a loader arm pivoted to said tractor and extending forwardly of the tractor, a grader frame of substantial horizontal area, upstanding lug means on the intermediate portion of said frame, means pivotally connecting the end of said loader arm to the top portion of said lug means, whereby said frame may be supported in a substantially horizontal position forwardly of the tractor below said loader arm, said frame including a plurality of longitudinal members and spaced non-parallel transversely extending scraper blades secured to said longitudinal members, an upstanding arm rigidly secured to the frame and being spaced longitudinally from said lug means, and a fluid pressure operated extensible link member connected between an intermediate portion of said loader arm and the top end portion of said upstanding arm, whereby the angular position of the frame may be regulated responsive to operation of said link member.

References Cited in the file of this patent

UNITED STATES PATENTS

| | | |
|---|---|---|
| 1,530,545 | Copeland et al. | Mar. 24, 1925 |
| 1,624,421 | Meyer | Apr. 12, 1927 |
| 1,913,897 | Porterfield | June 13, 1933 |
| 2,166,596 | Johnson | July 18, 1939 |

FOREIGN PATENTS

| | | |
|---|---|---|
| 662,087 | Great Britain | Nov. 28, 1951 |